UNITED STATES PATENT OFFICE.

ANSON G. BETTS, OF TROY, NEW YORK.

PRODUCTION OF ZINC SULFATE.

1,066,245. Specification of Letters Patent. Patented July 1, 1913.

No Drawing. Application filed December 9, 1912. Serial No. 735,628.

*To all whom it may concern:*

Be it known that I, ANSON G. BETTS, a citizen of the United States, residing at Troy, in the county of Rensselaer and State of New York, have invented certain new and useful Improvements in the Production of Zinc Sulfate, of which the following is a full, clear, and exact description.

This invention relates to the lixiviation, with dilute sulfuric or other acid, of oxidized or roasted zinc ore containing iron, and its chief object is to dissolve out the zinc as a salt (by conversion of the oxid to a salt) and prepare a solution free from iron in one and the same operation.

In treating roasted zinc ore with dilute acid, for example sulfuric acid, iron also dissolves (iron being almost always present in such ore) giving a solution of iron and zinc sulfates. The presence of iron in the solution is objectionable when the solution is to be used for the electrolytic production of zinc, or is to be used as zinc sulfate or other salt for chemical or other purposes. The iron may be removed by chemical means, but by my process it is cheaper and more convenient to prepare an iron-free solution in the first place.

It has been attempted to prepare an iron free solution by treatment of the roasted ore with a quantity of acid (sulfuric acid, for example) insufficient to convert all the zinc oxid into sulfate, on the theory that zinc oxid will be completely converted into sulfate or other salt, according to the acid employed, before any of the ferric oxid (peroxid of iron) will be converted. However, this method has been found to be unsuccessful because it is necessary to leave some zinc undissolved, thereby causing a loss of zinc; and the method is unsuccessful too in not preventing the solution of ferrous oxid (lower oxid of iron), which is almost always, if not always, present in commercially roasted ore. It has been the practice to afterward peroxidize the iron in the solution by the addition of oxidizing agents, and precipitate it out by adding zinc oxid, or roasted zinc ore, causing a voluminous slimy precipitate expensive to separate and resulting also in a loss of zinc in the precipitate, and loss of zinc in undissolved zinc oxid or incompletely leached zinc ore. The cost of such peroxidation is somewhat high, also, due to the quantity of oxidizing chemicals necessary.

I am also aware that it has been proposed to extract zinc from roasted ores, by the treatment of said roasted ore with a solution of ferric sulfate, containing some free sulfuric acid, but this process is open to the objection that the solution produced by thus treating the ore, contains iron, partly from the iron of the original solution, and partly as iron dissolved from the roasted ore.

With my invention I accomplish the same object with a small portion of the cost and with much less delay and difficulty, by adding a small quantity of peroxidizing chemical stronger in its action than ferric sulfate solution, to the dilute sulfuric acid used for lixiviating. A chromate or chromic acid (which are chemically equivalent in the process), or a permanganate, or permanganic acid, is suitable. A very small quantity is sufficient. I am not at present able to offer any chemical explanation of the action of the oxidizing agent in preventing the solution of the iron in the ore, but can only state that it accomplishes the desired result, even in the presence of an excess of sulfuric acid. I recommend the use of a slight excess of the acid reagent in order to dissolve as much of the zinc as possible. It is not usually possible to dissolve all the zinc present in roasted ore with diluted sulfuric acid, an extraction of 90%, for example, being considered about the best that can be done.

By means of this process, I can extract from low grade ore as much as 90% of the zinc, without dissolving any of the iron present. As before stated, the process is not limited to the production of sulfate, but may be used to produce other salts if desired. It is especially applicable to the production of sulfate, as the sulfate is the most important for the electrolytic production of zinc from the solution, and the iron-free solution is especially suitable for the purpose mentioned or for the crystallization of pure zinc sulfate.

What I claim is:

1. In extracting zinc from material containing zinc in the form of oxid, the treatment of said material with sulfuric acid in the presence of an oxidizing agent stronger in its oxidizing action than ferric sulfate.

2. In extracting zinc from material containing zinc in the form of oxid, the treatment of said material with sulfuric acid in the presence of an oxidizing agent comprising a compound of an element which acts with different valencies, both as an acid-forming and base-forming element.

3. In extracting zinc from material containing zinc in the form of oxid, the treatment of said material with sulfuric acid in the presence of an oxidizing agent including a compound containing manganese as an acid-forming element.

4. In extracting zinc from material containing zinc in the form of oxid, the treatment of said material with sulfuric acid in the presence of an oxidizing agent including a compound of a metal peroxid soluble in acid.

5. In extracting zinc from material containing zinc in the form of oxid, the treatment of said material with sulfuric acid in the presence of an oxidizing agent including permanganic acid.

6. In extracting zinc from material containing zinc as oxid, the treatment of said material with dilute acid containing in solution an oxidizing agent stronger in its oxidizing action than is the ferric salt of the said acid.

In testimony whereof I affix my signature in the presence of two subscribing witnesses.

ANSON G. BETTS.

Witnesses:
 ROBERT C. LIEB,
 BENJ. STARBUCK.

Copies of this patent may be obtained for five cents each, by addressing the "Commissioner of Patents, Washington, D. C."